(12) United States Patent
Knoll

(10) Patent No.: US 8,002,002 B2
(45) Date of Patent: Aug. 23, 2011

(54) OIL FILTER DRAIN TOOL

(76) Inventor: Bobby Knoll, Borger, TX (US)

( * ) Notice: Subject to any disclaimer, the term of this patent is extended or adjusted under 35 U.S.C. 154(b) by 54 days.

(21) Appl. No.: 12/562,609

(22) Filed: Sep. 18, 2009

(65) Prior Publication Data
US 2010/0084026 A1    Apr. 8, 2010

Related U.S. Application Data

(60) Provisional application No. 61/102,399, filed on Oct. 3, 2008.

(51) Int. Cl.
*B65B 1/04* (2006.01)
(52) U.S. Cl. .............................. 141/330; 141/1; 137/318
(58) Field of Classification Search .............. 141/1, 330; 137/318
See application file for complete search history.

(56) References Cited

U.S. PATENT DOCUMENTS

| | | | |
|---|---|---|---|
| 3,817,302 A * | 6/1974 | Kowal et al. ................... | 141/383 |
| 3,926,340 A * | 12/1975 | Tygenhof ..................... | 222/83.5 |
| 4,071,012 A * | 1/1978 | Cooke ........................... | 137/321 |
| 4,177,529 A * | 12/1979 | Sikula, Jr. ......................... | 7/100 |
| 5,546,979 A | 8/1996 | Clark, II et al. | |
| 5,558,140 A | 9/1996 | Clark, II | |
| 5,560,269 A | 10/1996 | Zelenka | |
| 5,694,972 A | 12/1997 | King | |
| 5,896,886 A * | 4/1999 | Wendt ............................ | 137/318 |
| 7,077,177 B2 * | 7/2006 | Awad ............................. | 141/330 |
| 7,219,684 B2 | 5/2007 | Dabir et al. | |
| 2005/0211024 A1 | 9/2005 | Shpakow | |

* cited by examiner

*Primary Examiner* — Timothy L Maust
(74) *Attorney, Agent, or Firm* — Charles D. Gunter, Jr.

(57) ABSTRACT

A fluid filter draining device is shown for draining fluid from a fluid container, such as an oil filter, in a controlled manner. An engagement ring is frictionally engaged on the outer sidewalls of a fluid filter. The engagement ring carries a threaded screw with a sharpened tip and a channel communicating between an opening at a forward end of the screw and a rear region of the threaded screw. When the screw is turned it penetrates the sidewall of the fluid container and enters the fluid containing cavity of the filter. Fluid is drained through the channel in the drill tip and out through an associated swivel hose connection and swivel hose to a collection container.

10 Claims, 2 Drawing Sheets

OIL FILTER DRAIN TOOL

CROSS-REFERENCE TO RELATED APPLICATION

The present application claims priority from earlier filed provisional application Ser. No. 61/102,399, filed Oct. 3, 2008, entitled "Oil Filter Drain Tool," by the same inventor.

BACKGROUND OF THE INVENTION

1. Field of the Invention

This invention relates generally to an apparatus for removing fluid from a container and more specifically to a device and method for draining hot fluid from, for example, an oil filter before the filter is removed from an associated motor or machinery, to avoid leakage or spillage of the fluid from the filter.

2. Description of the Prior Art

Lubrication systems in machinery, aircraft and vehicles include oil filters, which must be replaced periodically to maintain the good working order of the engine and machinery. For passenger automobiles, many mechanics recommend a oil and filter change every 3,000 miles of travel to maintain maximum engine life. Professional truckers put hundreds of thousands of miles on their trucks every year and as a result require frequent oil changes.

Replacing the oil in a motor vehicle typically involves placing a large oil drain basin under the oil pan, removing the drain plug, thereby allowing the oil to drain therein, followed by unscrewing the oil filter from the engine block. Due to the engine designs of most engines, it has been difficult to remove oil filters without spilling oil onto the frame of the vehicle or surrounding work area and, more importantly, onto the mechanics doing the work. Since many oil changes are conducted when the oil is very hot, this also poses a safety issue to mechanics.

There have been various attempts in the prior art to solve the problem presented by removing a hot oil filter from a vehicle or other type of machinery. For example, U.S. Pat. No. 7,297,282 to Suzumori et al., shows a complicated oil drain tool. The drain mechanism includes a cap which is engaged with a case and having a drain hole. A drain member in the form of a drain plug is detachably mounted to the cap from an outer side thereof, thereby closing the drain hole. A valve member is provided in an inner side of the cap, closing the drain hole, and a spring energizer acts to urge the valve member in a direction which closes the drain hole. When the drain member is detached from the cap, residual fluid is discharged by a tubular draining jig which is inserted within the drain hole.

An earlier device is described in U.S. Pat. No. 4,177,529 to Sikula, Jr., which shows an oil filter draining wrench which has a cylindrical housing with a center punch for punching and draining oil from an oil filter. The filter wrench is hammered onto the filter. An oil drain outlet is used to drain the oil from the housing which collects it. In the tight engine compartments of modern motor vehicles, there would not likely be enough room for a mechanic to place such a housing over the oil filter or to swing a hammer.

U.S. Pat. Nos. 4,776,431 and 4,865,156 to Poling both show oil change devices which utilize punches and vacuum chambers. The vacuum chambers are attached by suction to the oil filter, and the punches are driven into the filter's sidewalls, penetrating the filter. Oil is evacuated out of the filter, through the vacuum chamber, and out the evacuation tube.

U.S. Pat. No. 5,299,714 to Kilgore discloses what is said to be a self-sealing oil filter punch, which is driven into the metal housing of an oil filter, so the oil can be drained through the hollow center of the punch and out the oil filter. The sharp tip of the punch is pushed through the bottom of the oil filter, and the punch has a resilient washer for sealing the punch against the oil filter's housing. A spigot valve is located on the end of the Kilgore device to control the oil flow through the punch.

While the above devices may have represented advances in the state of the art at the time, there remains a need for a filter draining apparatus of the above type which is easy to use, simple in design, and which adequately prevents spilling hot oil onto a mechanic or onto the surrounding work area.

SUMMARY OF THE INVENTION

The fluid filter draining device of the invention allows hot fluid to be removed from the filter in a controlled manner and is intended to be used with a fluid filter of the type having a filter body with cylindrical sidewalls defining a fluid filled interior region there between, such as an oil filter on a vehicle. The device includes a cylindrical engagement ring having an exterior sidewall and an interior sidewall defining an inner circumferential area which is selectively sized to frictionally engage the filter body cylindrical sidewalls for positioning the engagement ring on the filter to be drained. The engagement ring also has a threaded access port at one circumferential location thereon. A sharpened drill tip is surrounded by a threaded shaft. The threaded shaft is sized to be threadedly received within the threaded access port of the engagement ring. The drill tip has an inner extent and an outer extent, and a longitudinal internal channel which communicates between the inner and outer extents thereof.

A turning knob is associated with the engagement ring and has a central bore for receiving the drill tip and associated threaded shaft. The knob has an inner face and an outer face separated by a predetermined thickness which is selected to allow the drill tip to extend beyond the knob inner face when the drill tip is received within the central bore of the turning knob. The drill tip and threaded shaft are fixed within the central bore of the knob when the device is assembled, whereby turning the knob by hand causes the drill tip to advance through the threaded access port of the engagement ring and into the inner circumferential area to thereby penetrate the filter body sidewall.

The central bore of the turning knob also receives a swivel hose fitting therein, the fitting having an inner extent received within the central bore and an outer extent which extends beyond the outer face of the turning knob for receiving and engaging a swivel hose. The swivel hose fitting also has a central bore which communicates with the longitudinal internal channel of the drill tip, whereby fluid drained from the filter can be drawn out through the swivel hose fitting and an associated swivel hose.

Preferably, the central bore of the engagement ring is also provided with a gasket receiving recess formed therein. An O-ring seal is located within the recess to assist the sliding process in positioning tool onto filter, then the O-ring is positioned onto the shoulder of the drill tip, forming a fluid tight seal between the threaded shaft, drill tip and the filter cylindrical sidewall during the filter draining operation, when the drilling operation is engaged.

DETAILED DESCRIPTION OF THE INVENTION

The present invention provides an improved device for removing oil from an oil filter that meets the foregoing objectives. The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

Figure 4:
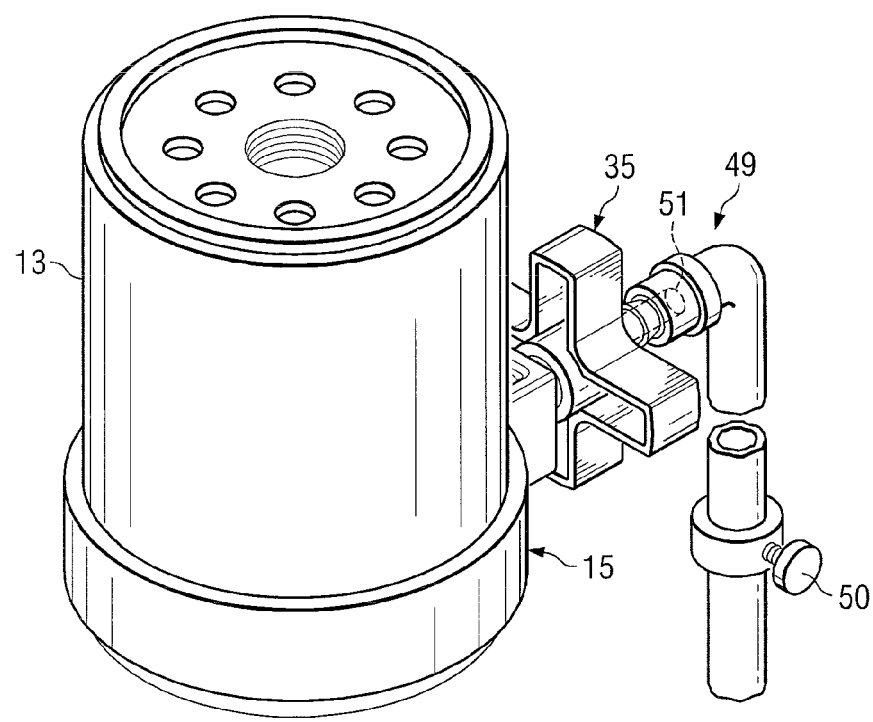
FIG. 4 is a perspective view of the device of the invention in place on an oil filter cannister.

Turning first to FIG. 4, there is shown a perspective view of the device of the invention 11 which is used for drawing fluid from a container 13. The container 13 shown in FIG. 4 is a conventional oil filter such as is used on vehicle motors and machinery. The devices of the invention can be used to drain any number of containers, such as drums, cans, filters or pipes, of any number of fluids, e.g. lubricants, coolants, inks, and other chemicals, but is preferably used to drain an oil filter.

Figure 1:
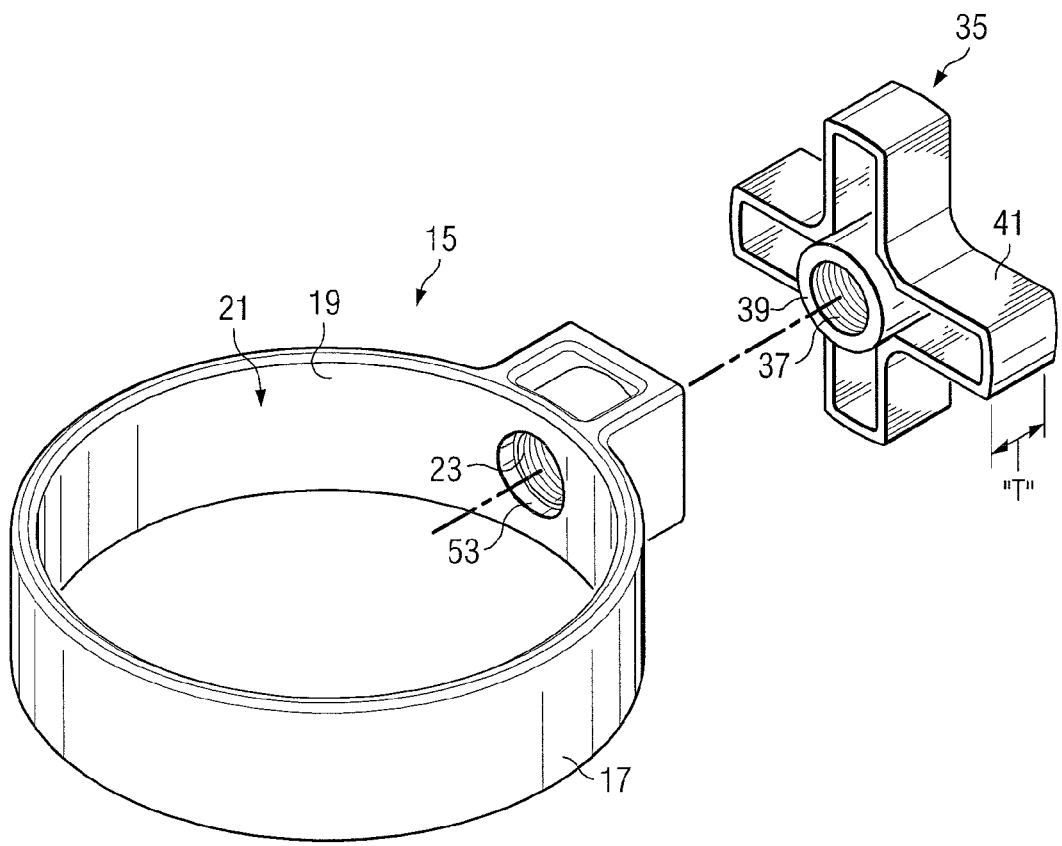
FIG. 1 is a perspective view of the engagement ring and turning knob of the device of the invention, shown in exploded fashion and without the drill tip and associated threaded shaft for ease of illustration.

The device 11, as best seen in FIG. 1 includes an engagement ring 15 which can be formed of any convenient material including metals, plastics, composites, and the like. Preferably, the engagement ring is formed of a red nylon plastic which is fiberglass filled. The engagement ring 15 is cylindrical in shape and has an exterior sidewall 17 and an interior sidewall 19 which together define an inner circumferential area 21 which is selectively sized to frictionally engage the filter body 13 cylindrical sidewalls for positioning the engagement ring on the filter to be drained. The engagement ring also has an internally threaded access port 23 at one circumferential location thereon.

Figure 2:
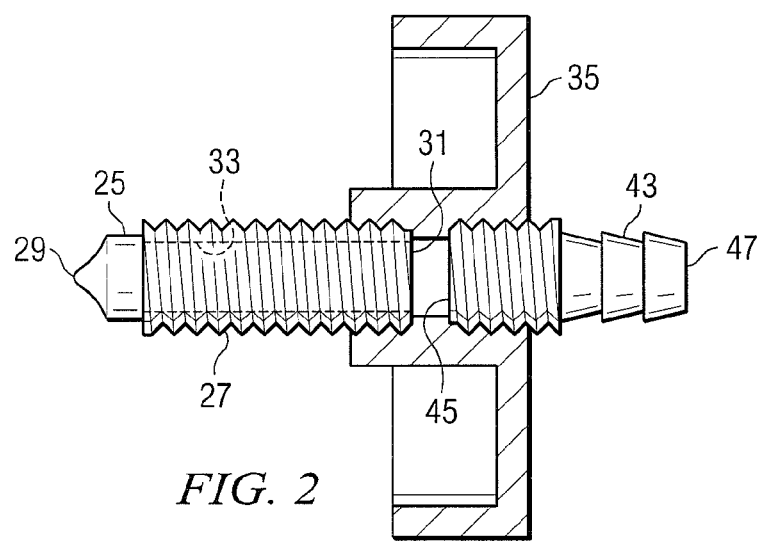
FIG. 2 is a side view of the isolated drill tip, threaded shaft, turning knob and swivel hose fitting which make up various component parts of the device of the invention.
Figure 3:
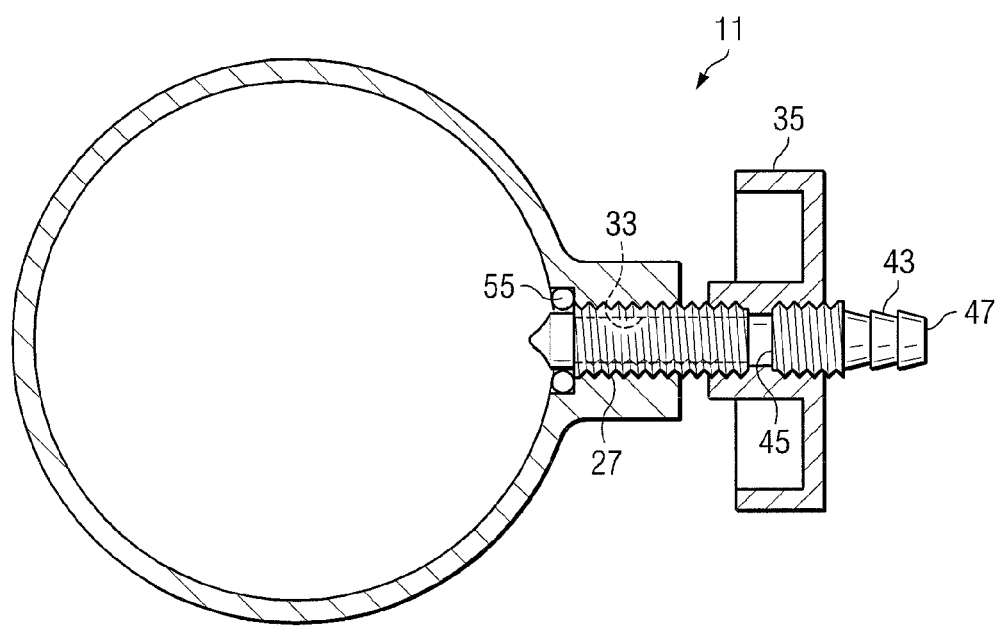
FIG. 3 is a view similar to FIG. 2, but showing the drill tip and associated component parts assembled within the engagement ring to complete the assembly of the device.

As will be appreciated from FIGS. 2 and 3, the filter draining device of the invention also includes a sharpened drill tip 25, formed of metal, which is surrounded by a threaded shaft 27. The threaded shaft 27 is sized to be threadedly received within the threaded access port 23 of the engagement ring 15. The drill tip 25 also has an inner extent 29, an outer extent 31, and a longitudinal internal channel 33 which communicates between the inner and outer extents 29, 31, thereof.

A turning knob 35, also formed of a yellow nylon plastic, is provided with a central bore 37 for receiving the drill tip 25 and associated threaded shaft 27. The turning knob 35 has an inner face 39 and an outer face 41 separated by a predetermined thickness ("t" in FIG. 1) which is selected to allow the drill tip 25 to extend beyond the knob inner face when the drill tip 25 is received within the central bore 37 of the turning knob 35 (see FIG. 3). The drill tip and threaded shaft are fixed in place within the central bore 37 of the knob 35, whereby turning the knob 35 by hand causes the drill tip 25 to advance through the threaded access port 23 of the engagement ring 15 and into the inner circumferential area 21 to thereby penetrate the filter body sidewall (generally at 13 in FIG. 4).

In its preferred form, the central bore 37 of the turning knob 35 also receives a swivel hose fitting (43 in FIGS. 2 and 3) therein, the fitting having an inner extent 45 received within the central bore 37 and an outer extent 47 which extends beyond the outer face 41 of the turning knob 35 for receiving and engaging a swivel hose (shown generally as 49 in FIG. 4). The swivel hose fitting 43 also has a central bore (51 in FIG. 4) which communicates with the longitudinal internal channel 33 of the drill tip 25, whereby fluid drained from the filter 13 can be drawn out through the swivel hose fitting 43 and an associated swivel hose 49. The swivel hose 49, which is typically supplied as an option by the customer, can also be provided with an on-off valve 50, if desired, to control the flow of fluid through the hose.

In order to form a seal between the device of the invention and the filter cannister sidewall, the central bore 37 of the engagement ring 15 has a gasket receiving recess (53 in FIG. 1) formed therein. An O-ring seal (55 in FIG. 3) is located within the recess 53 during the sliding application process. The O-ring forms a fluid tight seal between the threaded shaft 27, drill tip 25 and the filter cylindrical sidewall during the filter draining operation. When the drill is engaged, the recess 53 in the engagement ring 15 at the inside diameter bottom of the central bore 37 is for O-ring 55 location when the threaded shaft 27 is retracted back to begin the engagement ring's attachment to the filter cannister.

In operation, the engagement ring 15 is positioned about the cylindrical sidewalls of the filter cannister with the turning knob 35 and associated drill bit tip 25 assembled. The operator then turns the knob 35, driving the drill bit tip 25 into the cannister sidewall until the sidewall has been pierced and the drill tip has entered the cannister interior. Hot oil can then flow through the drill bit tip 25, through the swivel hose fitting 43 and through the swivel hose 49 to a collection container. If desired, a vacuum can be applied through the swivel hose to assist in the flow of hot oil. Once the filter cannister has been drained of oil, the filter can be unscrewed and safely removed.

An invention has been provided with several advantages. The device is simple in design and economical to manufacture. The device safely removes hot oil from an oil filter cannister, so that the danger of hot oil being spilled during the subsequent filter removal is eliminated. The device provides an easy, fast and secure method of draining hot oil from a filter while the filter is in place on a vehicle motor or other piece of machinery.

While the invention has been shown in only one of its forms, it is not thus limited but is susceptible to various changes and modifications without departing from the spirit thereof, as described in the claims which follow.

What is claimed is:

1. A fluid filter draining device which allows hot fluid to be removed from the filter in a controlled manner, the fluid filter having a filter body with cylindrical sidewalls defining a fluid filled interior region there between, the fluid filter draining device comprising:

a cylindrical engagement ring having an exterior sidewall and an interior sidewall defining an inner circumferential area which is selectively sized to frictionally engage the filter body cylindrical sidewalls for positioning the engagement ring on the filter to be drained, the engagement ring also having a threaded access port at one circumferential location thereon;

a sharpened drill tip surrounded by a threaded shaft, the threaded shaft being sized to be threadedly received within the threaded access port of the engagement ring, the drill tip having an inner extent and an outer extent, and a longitudinal internal channel which communicates between the inner and outer extents thereof;

a turning knob having a central bore for receiving the drill tip and associated threaded shaft, the knob having an inner face and an outer face separated by a predetermined thickness which is selected to allow the drill tip to extend beyond the knob inner face when the drill tip is received within the central bore of the turning knob, the drill tip and threaded shaft being fixed within the central bore of the knob, whereby turning the knob by hand causes the drill tip to advance through the threaded access port of the engagement ring and into the inner circumferential area to thereby penetrate the filter body sidewall; and wherein the central bore of the turning knob also receives a swivel hose fitting therein, the fitting having an inner extent received within the central bore and an outer extent which extends beyond the outer face of the turning knob for receiving and engaging a swivel hose, the swivel hose fitting also having a central bore which communicates with the longitudinal internal channel of the drill tip, whereby fluid drained from the filter can be drawn out through the swivel hose fitting and an associated swivel hose.

2. The fluid filter draining device of claim 1, wherein the central bore of the engagement ring has a gasket receiving recess formed therein, and wherein an O-ring seal fits within the recess during the sliding process to position tool onto filter, then the O-ring is positioned onto the shoulder of the drill tip for forming a fluid tight seal between the threaded shaft, drill tip and the filter cylindrical sidewall during the filter draining operation, when a drill is engaged.

3. The filter draining device of claim 2, wherein the engagement ring and turning knob are formed from a nylon plastic material.

4. The fluid filter draining device of claim 3, wherein the swivel hose has an on/off valve associated therewith for controlling the flow of fluid from the filter during the draining operation.

5. The fluid filter draining device of claim 4, wherein the device is adapted for use in draining fluid from fluid filters which are still positioned on machines and motors.

6. The fluid filter draining device of claim 5, wherein the fluid container is an oil filter adapted to be positioned on a motor.

7. A method of draining hot fluid from a fluid filter in a controlled manner, the fluid filter having a filter body with cylindrical sidewalls defining a fluid filled interior region there between, the method comprising the steps of:

providing a cylindrical engagement ring having an exterior sidewall and an interior sidewall defining an inner circumferential area which is selectively sized to frictionally engage the filter body cylindrical sidewalls for positioning the engagement ring on the filter to be drained, the engagement ring also having a threaded access port at one circumferential location thereon;

positioning the engagement ring on the cylindrical sidewall of the filter;

providing a sharpened and shaped drill tip surrounded by a threaded shaft and positioning the threaded shaft of the drill tip within the threaded access port of the engagement ring, the threaded shaft being threadedly received within the threaded access port of the engagement ring, the drill tip having an inner extent and an outer extent, and a longitudinal internal channel which communicates between the inner and outer extents thereof;

providing a turning knob which cooperates with the drill tip and engagement ring, the turning knob having a central bore for receiving the drill ti and associated threaded shaft the knob having an inner face and an outer face separated by a predetermined thickness;

locating the drill tip and associated threaded shaft within the central bore at a location which is selected to allow the drill tip to extend beyond the knob inner face when the drill tip is received within the central bore of the turning knob;

fixing the drill tip and threaded shaft within the central bore of the knob, whereby turning the knob by hand causes the drill tip to advance through the threaded access port of the engagement ring and into the inner circumferential area to thereby penetrate the filter body sidewall;

providing the central bore of the turning knob with a swivel hose fitting, the fitting having an inner extent received within the central bore and an outer extent which extends beyond the outer face of the turning knob for receiving and engaging a swivel hose, the swivel hose fitting also having a central bore which communicates with the longitudinal internal channel of the drill tip, whereby fluid drained from the filter can be drawn out through the swivel hose fitting and an associated swivel hose mounting the engagement ring on a fluid filter containing hot fluid;

attaching a hose to the swivel hose fitting;

turning the turning knob so that the drill tip penetrates the cylindrical sidewall of the fluid filter; and draining off hot fluid from the fluid filter through the swivel hose fitting and attached hose.

8. The method of claim 7, further comprising the steps of forming a gasket receiving recess in the central bore of the engagement ring and positioning an O-ring seal within the recess during the sliding process to position the tool onto the filter;

wherein the O-ring is subsequently positioned onto the shoulder of the drill tip for forming a fluid tight seal between the threaded shaft, drill tip and the filter cylindrical sidewall during the filter draining operation.

9. The method of claim 8, wherein the O-ring seal is initially located on an intersection between an outer extent of the drill tip and the threaded shaft, and wherein the gasket receiving recess is provided to trap and locate the O-ring seal during drilling operations.

10. The method of claim 9, wherein the O-ring is located within the gasket receiving recess when the threaded shaft is retracted back from a position in which the engagement ring is attached upon the filter cannister sidewall for drilling operations to begin.

* * * * *